March 12, 1968 H. BANASIEWICZ ET AL 3,373,372

INPUT STAGE FOR A.C. AMPLIFIERS

Filed May 14, 1964

3,373,372
INPUT STAGE FOR A.C. AMPLIFIERS
Henryk Banasiewicz, London, and Kenneth Phillip Frank Terrill, Wealdstone, Middlesex, England, assignors to Joseph Lucas (Industries) Limited, Birmingham, England
Filed May 14, 1964, Ser. No. 367,377
Claims priority, application Great Britain, July 22, 1963, 28,856/63
2 Claims. (Cl. 330—51)

ABSTRACT OF THE DISCLOSURE

In an input stage for chopping a direct current supply and feeding it to an A.C. amplifier, the direct current is fed through a first switching device and a capacitor in series to the amplifier, and connected across the series connection of the capacitor and amplifier is a second switching device, the switching devices being operated so that when one is conducting the other is not. In addition, in order to absorb any transients resulting from the operation of the switching devices, a capacitor is connected across the D.C. supply.

Figures 1, 2:
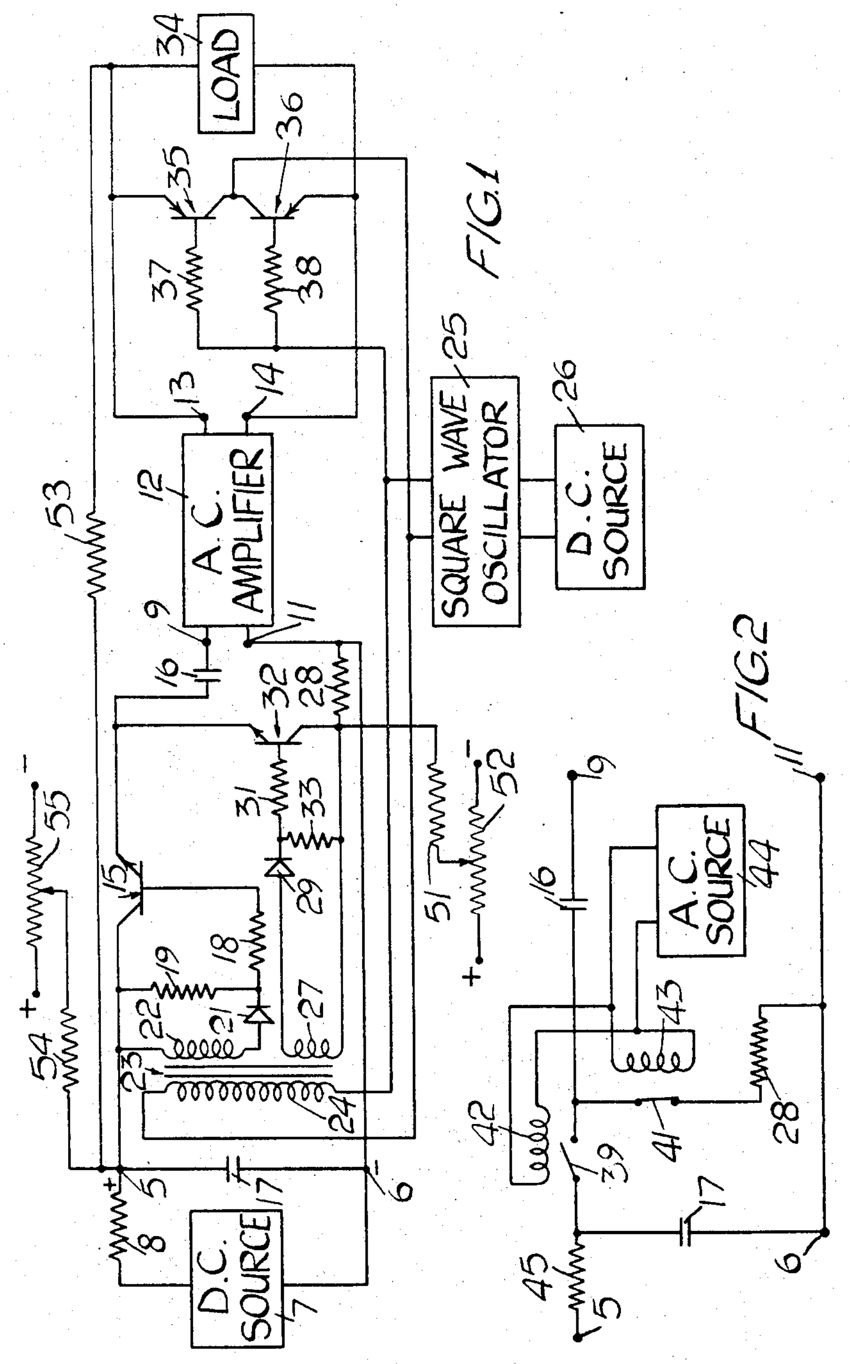

This invention relates to an input stage or an A.C. amplifier, the input stage being of the kind in which a D.C. signal is interrupted periodically by means of a switching device. The invention is particularly suitable for D.C. chopper amplifiers in which the D.C. level in the output from the A.C. amplifier is restored, but it can be used in other applications where an input stage from a D.C. source to an A.C. amplifier is required.

The object of the invention is to provide such a stage in a form whereby the transmission to the amplifier of transients resulting from the action of the switching device is minimised.

An input stage according to the invention comprises in combination first and second terminals between which a D.C. source is connected in use, third and fourth terminals which in use are connected to the amplifier, the second and fourth terminals being interconnected, a first switching device and a first capacitor connected in series between the first and third terminals, a second capacitor connected in a series circuit across the first and second terminals, a second switching device connected between the fourth terminal and a point intermediate the first switching device and first capacitor, and means for opening and closing said switching devices out of phase with one another, the arrangement being such that in use when the first and second switching devices are closed and opened respectively the first capacitor is charged through the first switching device, but when the first and second switching devices are opened and closed respectively the first capacitor discharges through the amplifier and the second switching device, said second capacitor serving to minimise the transmission of transients to the amplifier.

In the accompanying drawings, FIGURE 1 is a circuit diagram illustrating one example of the invention as applied to a D.C. chopper amplifier, and FIGURE 2 is a fragmentary view illustrating a modification.

Referring to FIGURE 1, there are provided a pair of terminals 5, 6 which in use are connected to a D.C. source 7 so as to be positive and negative respectively. Conveniently, the negative terminal is earthed. The resistor 8 represents the internal resistance of the source 7.

There are further provided terminals 9, 11 which provide an input to an A.C. amplifier 12 having output terminals 13, 14. The terminals 6, 11 are interconnected, and the terminal 5 is connected to the collector of an npn transistor 15 the emitter of which is connected through a capacitor 16 to the terminal 9. Moreover, the terminals 5, 6 are interconnected through a capacitor 17.

The base and collector of the transistor 15 are interconnected through resistors 18, 19 in series, a point intermediate these resistors being connected to the terminal 5 through the cathode and anode of a diode 21 in series with a secondary winding 22 of a transformer 23. The transformer 23 includes a primary winding 24 connected to a square wave oscillator 25 operated by a D.C. source 26, and a further secondary winding 27 one end of which is connected through a resistor 28 to the terminal 6, and the other end of which is connected through the anode and cathode of a diode 29 and a resistor 31 in series to the base of an npn transistor 32. The transistor 32 has its emitter connected to the emitter of the transistor 15 and its collector connected to the terminal 6 through the resistor 28, the collector being further connected through a resistor 33 to a point intermediate the diode 29 and resistor 31, and through a resistor 51 to a slider movable over a resistor 52 which is fed with a D.C. supply.

The output terminals 13, 14 of the amplifier 12 are interconnected through a load 34, and are further connected to the emitters of a pair of pnp transistors 35, 36 respectively. The transistors 35, 36 have their bases and collectors interconnected and connected to the output from the oscillator 25, resistors 37, 38 being provided in the base circuits respectively. A feedback resistor 53 may be connected between the terminals 5, 13, and the terminals 5 is also connected through a resistor 54 to a slider movable over a resistor 55 fed with a D.C. supply.

In operation, during the positive half-cycles of the output from the oscillator 25, the voltage developed in the winding 22 causes current to flow through the diode 21 and resistors 18, 19 to render the transistor 15 conductive. However, the transistor 32 remains non-conductive because the windings 22, 27 are oppositely wound. During the positive half-cycles, the capacitor 16 is charged from the source 7 through the transistor 15.

During the negative half-cycles of the output from the oscillator 25, the transistor 15 is non-conductive but the transistor 32 is rendered conductive by current flowing through the diode 29 and resistors 31, 33. The capacitor 16 now discharges through the amplifier 12, the variable resistor 28 and the transistor 32. The amplifier 12 thus receives a pulsed input which is amplified, so that an A.C. output appears at the terminals 13. 14. This output is fed to the load 34, but during alternate half-cycles the transistors 35, 36 are rendered conductive simultaneously by the oscillator 25 so that the load 34 is short circuited. In this way the D.C. level is restored and the current flowing in the load 34, which may be a measuring instrument, is proportional to the current taken from the source 7.

It is very important that the transmission of high frequency transients to the amplifier 12 should be minimised, since such transients not only reduce the accuracy of the circuit, but may damage the amplifier 12. Transients can be produced by any components having capacitance, and in order to reduce the transients to a minimum the transistors used are so-called planar transistors having low capacitance, and similarly the diodes 21, 29 are planar diodes. Identical transistors 15, 32 are employed, any manufacturing tolerances being allowed for by adjusting the position of the slider on the resistor 52.

It is not possible to eliminate the transients altogether by careful choice of circuit components, but their effect is substantially eliminated by the inclusion of the capacitor 17, which provides a low impedance path for the transients, so that they are not passed to the amplifier 12.

The transients produced when the transistors 15, 32 are rendered conductive and non-conductive charge the capacitor 17 in opposite directions and so tend to neutralise one another, but any resultant charge on the capacitor 17 merely changes the D.C. level of the input to the amplifier, and can be allowed for by adjusting the position of the slider on the resistor 55.

Transients are also produced at the output side of the amplifier 12, but are not as serious because they are not fed to the amplifier and their magnitude is not amplified. However, the transients are reduced by employing two transistors 35, 36 the transients from which tend to neutralise one another.

It will be understood that the transistors 15, 32 are acting as switching devices, and numerous other forms of switching devices could be used. As an example, FIGURE 2 shows a circuit in which the transistors 15, 32 are replaced respectively by a normally open relay contact 39 and a normally closed relay contact 41, the contacts being operated respectively by coils 42, 43 driven in phase by an A.C. source 44. Clearly, the coils could be driven out of phase, in which case both contacts would have to be either normally closed or normally open.

In some cases, the source resistance 8 may be too low. In this case, the terminal 5 is connected to the remainder of the circuit through a resistor 45 as shown in FIGURE 2.

Having thus described our invention what we claim as new and desire to secure by Letters Patent is:

1. An input stage for an A.C. amplifier comprising in combination first and second terminals between which a D.C. source is connected in use, third and fourth terminals which in use are connected to the amplifier, the second and fourth terminals being interconnected, a first switching device and a first capacitor connected in series between the first and third terminals, a second capacitor connected in a series circuit across the first and second terminals, a second switching device connected between the fourth terminal and a point intermediate the first switching device and first capacitor, and means for opening and closing said switching devices out of phase with one another, the arrangement being such that in use when the first and second switching devices are closed and opened respectively, the first capacitor is charged through the first switching device, but when the first and second switching devices are opened and closed respectively the first capacitor discharges through the amplifier and the second switching device, said second capacitor serving to minimise the transmission of transients to the amplifier.

2. An input stage as claimed in claim 1 including a resistor through which the second switching device is connected to the fourth terminal.

References Cited

UNITED STATES PATENTS

| | | | |
|---|---|---|---|
| 3,050,636 | 8/1962 | Sommerfield. | |
| 3,265,979 | 8/1966 | Staunton | 330—51 X |

FOREIGN PATENTS

| | | |
|---|---|---|
| 1,132,215 | 6/1962 | Germany. |

NATHAN KAUFMAN, *Examiner.*

ROY LAKE, *Primary Examiner.*